(12) United States Patent
Hu et al.

(10) Patent No.: US 7,844,600 B2
(45) Date of Patent: Nov. 30, 2010

(54) MATERIALIZED VIEWS WITH USER-DEFINED AGGREGATES

(75) Inventors: Ying Hu, Nashua, NH (US); Seema Sundara, Nashua, NH (US); Jagannathan Srinivasan, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 354 days.

(21) Appl. No.: 11/827,796

(22) Filed: Jul. 13, 2007

(65) Prior Publication Data

US 2009/0019005 A1  Jan. 15, 2009

(51) Int. Cl.
*G06F 7/00* (2006.01)
*G06F 17/30* (2006.01)

(52) U.S. Cl. ................ 707/717; 707/715; 707/716; 707/718

(58) Field of Classification Search ........... None
See application file for complete search history.

(56) References Cited

U.S. PATENT DOCUMENTS

| | | | |
|---|---|---|---|
| 6,345,272 B1 * | 2/2002 | Witkowski et al. | 707/4 |
| 6,496,819 B1 * | 12/2002 | Bello et al. | 707/3 |
| 2004/0122828 A1 * | 6/2004 | Sidle et al. | 707/100 |
| 2004/0128289 A1 * | 7/2004 | Cochrane et al. | 707/4 |
| 2005/0177579 A1 * | 8/2005 | Blakeley et al. | 707/100 |
| 2005/0235001 A1 * | 10/2005 | Peleg et al. | 707/200 |
| 2006/0047696 A1 * | 3/2006 | Larson et al. | 707/103 R |
| 2006/0085465 A1 * | 4/2006 | Nori et al. | 707/101 |
| 2007/0174346 A1 * | 7/2007 | Brown et al. | 707/200 |

* cited by examiner

*Primary Examiner*—Kuen S Lu
*Assistant Examiner*—Tuan Pham
(74) *Attorney, Agent, or Firm*—Kraguljac & Kalnay, LLC

(57) ABSTRACT

Systems, methodologies, media, and other embodiments associated with supporting materialized views with user-defined aggregates are described. One example system includes logic for exposing a set of interface actions to support a user-defined aggregate in a materialized view associated with a base table. The materialized view may store both the user-defined aggregate and a user-defined aggregate context that facilitates logically connecting the user-defined aggregate to the base table. The example system may also include logic for supporting the user-defined aggregate. The support may be based on the set of interface actions. Example systems and methods may, therefore, facilitate incremental updating of the materialized view and/or rewriting a query to access the materialized view.

8 Claims, 5 Drawing Sheets

MATERIALIZED VIEWS WITH USER-DEFINED AGGREGATES

BACKGROUND

Some databases support materialized views. Some databases support user-defined aggregate functions. Few databases, if any, support materialized views with user-defined aggregate functions. Databases that do provide such support have traditionally provided only limited, if any, support for user-defined aggregate functions in materialized views. Built-in aggregate functions (e.g., SUM, COUNT, MIN) have been supported for incremental maintenance in a materialized view. If a materialized view included a user-defined aggregate function then the materialized view had not been able to be incrementally maintained and certain query rewrite options for the materialized view were not available. This may have limited the usefulness of user-defined data types in materialized views since user-defined aggregate functions may be associated with user-defined data types.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
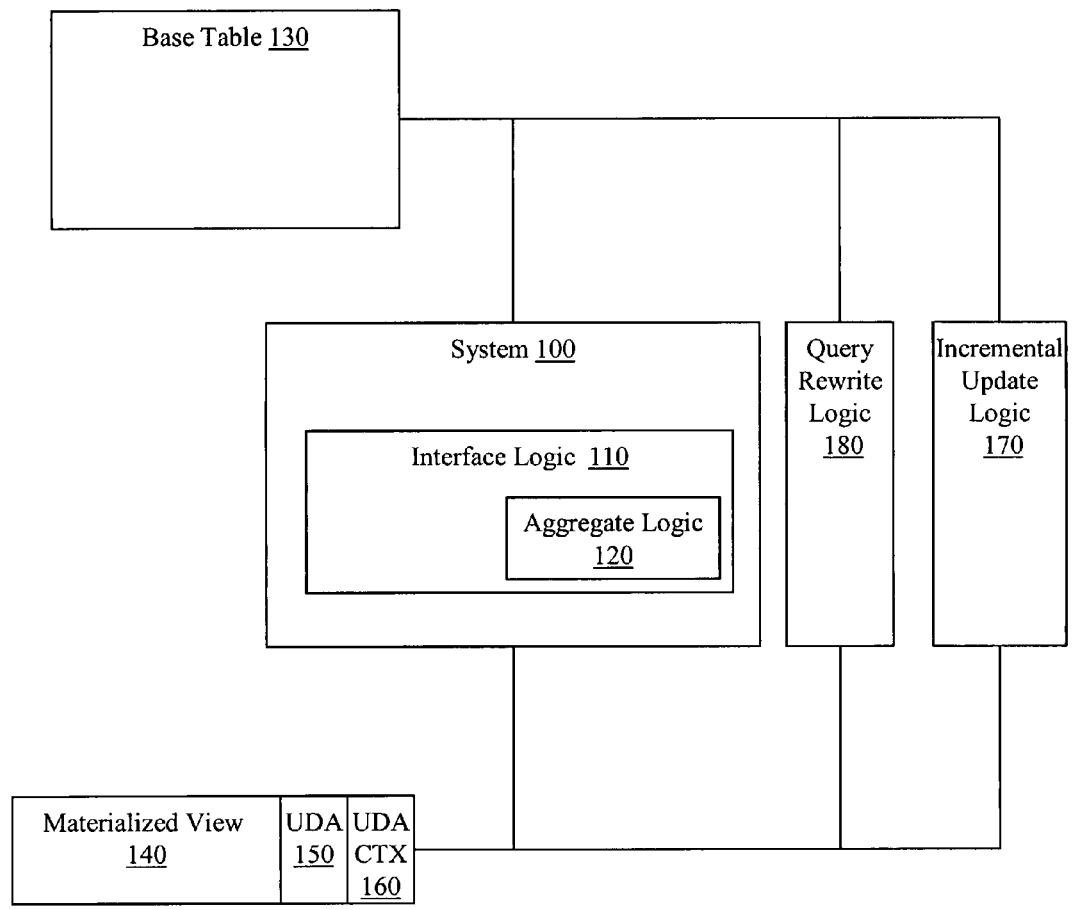
FIG. 1 illustrates an example system associated with materialized views having user-defined aggregates.

Example systems and methods support materialized views having user-defined aggregates. In one example, an interface may be provided and exposed by a database (DB) and/or database management system (DBMS) to facilitate establishing and incrementally updating a user-defined aggregate (UDA) in a materialized view (MV). The interface may provide methods that a user can implement to support their user-defined aggregate. The user-implemented methods may then be selectively invoked to support the user-defined aggregate in the MV. For example, when an MV is created, an initial value for the user-defined aggregate may be computed. When a base table upon which the MV depends is updated (e.g., insert, delete), then a user-implemented method may be invoked to incrementally update the user-defined aggregate. The user-implemented methods may therefore support incremental update of an MV having a user-defined aggregate. Example systems and methods therefore support query rewrites that may access the materialized view.

In one example, the interface may expose an initialize function to set an initial value for the user-defined aggregate. The interface may also expose an iterate function to facilitate incremental updating of a user-defined aggregate in an MV. The interface may also expose a merge function to facilitate updating a user-defined aggregate when a set of updates is made to a base table upon which the MV is based. The interface may also expose a terminate function to provide an up-to-date value associated with the user-defined aggregate. In one example, the interface may be the Oracle ODCI Aggregates interface and the functions may be the Oracle ODCI Aggregate interface functions. While an initialize function, an iterate function, a merge function, and a terminate function are described, it is to be appreciated that different examples may expose different functions having different names.

A materialized view may be built from data found in a base table. When the base table is manipulated the MV may be incrementally updated. For example, when a new row is added to the base table, data relevant to the MV may be provided to the MV and the MV may be updated based on that relevant data. Example systems and methods may expose an interface to provide the relevant data to a user-defined aggregate context that participates in updating a user-defined aggregate in light of the relevant data.

Traditional materialized views with user-defined aggregates are not incrementally updated when the base table upon which the MV depends is updated. Queries on materialized views with user-defined aggregates are typically not rewritten when the user-defined aggregate appears in the query. Instead, queries may be applied against the base table rather than the MV. Example systems and methods facilitate incrementally updating an MV having a user-defined aggregate. Example systems and methods also facilitate rewriting queries on materialized views having user-defined aggregates.

Example systems and methods may support these actions through an aggregation context. A database may keep a user-defined aggregate as an instance of a user-defined type. When an MV is created to include an instance of the type, then the user-defined aggregate may be allocated space (e.g., a column) in the MV. The aggregation context may also be allocated space. In one example, an additional column may be allocated in the MV for the aggregation context. The aggregation context may support incremental maintenance and query rewriting for the MV. To support these actions, the aggregation context may include a set of user-defined functions whose definitions are exposed to users. When an MV is created, one of the user-defined functions associated with the aggregation context may be invoked to establish an initial value for the user-defined aggregate. When a base table is manipulated, another of the user-defined functions associated with the aggregation context may be invoked to update the user-defined aggregate. Other user-defined functions may be invoked at other times.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a storage medium that stores instructions and/or data. A computer-readable medium may take forms, including, but not limited to, non-volatile media, and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

"Logic", as used herein, includes hardware, firmware, software stored on a computer-readable storage medium in execution, and/or combinations of each to perform a function(s) or an action(s), and/or to cause a function or action from another logic, method, and/or system. Logic may include a software controlled microprocessor, discrete logic (e.g., an application specific integrated circuit (ASIC)), an analog circuit, a digital circuit, a programmed logic device, a memory device containing instructions, and so on. Logic may include a gate(s), combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions in execution that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software, whether an entire system or a component of a system, may be embodied as an article of manufacture and maintained or provided as part of a computer-readable medium as defined previously.

"User", as used herein, includes but is not limited to one or more persons, software, computers or other devices, or combinations of these.

FIG. 1 illustrates a system 100 associated with materialized views having user-defined aggregates. System 100 includes an interface logic 110 and an aggregate logic 120. Interface logic 110 may be externally visible while aggregate logic 120 may only be visible internally. System 100 interacts with a base table 130 and a materialized view 140. Materialized view 140 may be based, at least in part, on table 130. For example, values in materialized view 140 may be taken from base table 130. While a single base table 130 is illustrated, it is to be appreciated that a materialized view may be based on a set of base tables. Materialized view 140 includes a user-defined aggregate (UDA) 150 and a user-defined aggregate context (UDA CTX) 160. User-defined aggregate 150 may produce a value from a set of values in materialized view 140.

User-defined aggregate context 160 may be an instance of a user-defined data type and may store information and/or executable instructions to support maintaining user-defined aggregate 150. Example code to create and manipulate aggregates and aggregate contexts is provided below.

Figure 2:
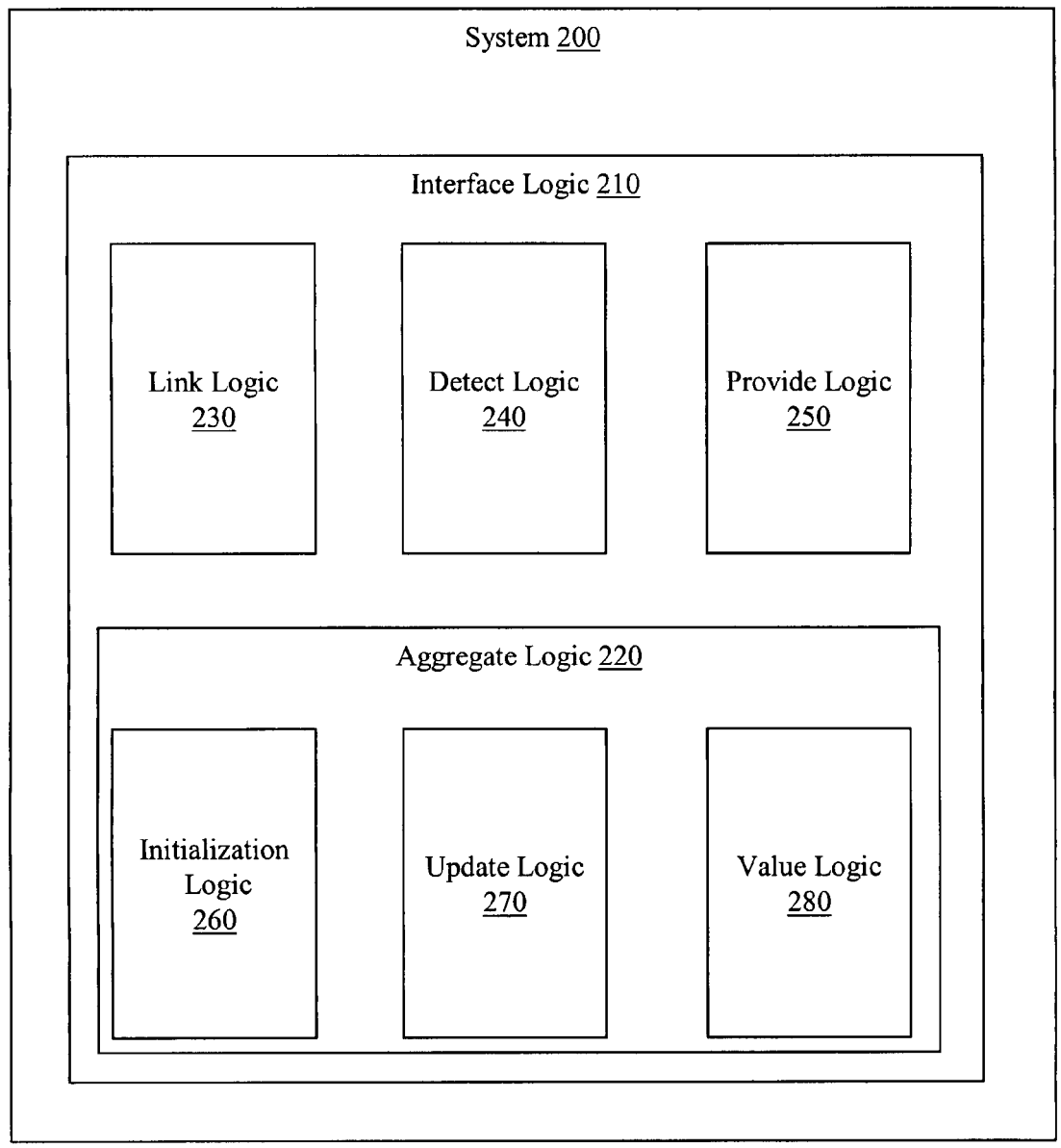
FIG. 2 illustrates another example system associated with materialized views having user-defined aggregates.

Interface logic 110 may expose a set of interface actions that support user-defined aggregate 150. The set of interface actions may include, for example, an initialization action, an update action, and a value reporting action. The interface logic 110 may expose the actions while the aggregate logic 120 may implement the actions. These actions may be implemented as logics as described in connection with system 200 (FIG. 2). The initialization action may include, for example, creating space for user-defined aggregate 150 and/or user-defined aggregate context 160 in materialized view 140.

Aggregate logic 120 supports the user-defined aggregate 150 using the set of interface actions. For example, when materialized view 140 is created with user-defined aggregate 150, the set of actions may facilitate determining the initial value for the user-defined aggregate 150. The set of actions may be bound to methods associated with the user-defined context 160. Thus, data manipulation language actions (e.g., insert, delete) that affect base table 130 and/or materialized view 140 may cause methods associated with user-defined aggregate context 160 to manipulate user-defined aggregate 150.

Having provided the support described by interface logic 110 and aggregate logic 120, system 100 may in turn facilitate incremental updating of the materialized view 140 and/or rewriting a query intended for the base table 130 to instead access the materialized view 140. Thus, in one example, system 100 may control an incremental update logic 170 associated with a database in which the base table 130 resides to selectively incrementally update the materialized view 140. Additionally, and/or alternatively, system 100 may control a query rewrite logic 180 associated with a database in which the base table 130 resides. The system 100 may control the logic 180 to selectively rewrite a query to access the base table 130 into a query to access the materialized view 140.

The following examples illustrate an MV having a user-defined aggregate that can be supported by example systems and methods described herein (e.g., system 100, system 200, method 300, method 400). A database may provide an interface (e.g., ODCIAggregate) to expose aggregate routines (e.g., initialize, iterate, terminate) that can be implemented by a user as methods within an object (e.g., MyAvgImpl). In the examples, this object (e.g., MyAvgImpl) supports a user-defined aggregate function (e.g., MyAVG) that returns the value of a running sum divided by a running count. The running sum may be the sum of a certain set of values in an MV. The running count may be the number of members of the set of values. The following code illustrates one example of methods associated with supporting the MyAVG function in an MV.

This object definition creates a type having two variables to be manipulated and methods for manipulating them.

```
create type MyAVGImpl as object
(
    runningCount NUMBER, -- cnt of input values seen so far
    runningSum NUMBER, -- sum of input values seen so far
    static function Initialize(...) return number,
    member function Iterate(...) return number,
    member function Terminate(...) return number,
    member function Merge(...) return number
);
```

Processing associated with the aggregate function MyAVG( ) may be controlled by user written code that is associated with the exposed functions. In this example, the processing includes:

```
1. Initialize(...) // initialize aggregate by initializing aggregation context
      runningSum = 0;
      runningCount = 0;
2. Iterate(...) // iteratively process input values, update aggregate context
      runningSum += inputval;
      runningCount++;
3. Merge(...) // merge aggregation contexts
      runningSum += input_runningSum;
      runningCount += input_runningCount;
4. Terminate(...) // compute result, return aggregate value
      return (runningSum/runningCount);
```

These user-defined functions may be invoked at different times based on different MV occurrences. For example, initialize( ) may be invoked when an MV is created. Initialize( ) can provide the initial value for runningSum and runningCount. Since no values have been added to the MV yet, the initial values are zero. Iterate may be invoked when data is added to the MV. This may occur when the MV is created (e.g., initially populated) and when the base table upon which the MV depends is updated (e.g., insert, delete). Iterate( ) will be provided with an input value and that value will be added to the runningSum. The number of values (runningCount) will be incremented. Terminate( ) may be called when a user wants to know the value of the user-defined aggregate.

Supporting the user-defined aggregate in the MV in the above described manner facilitates rewriting queries so that data will be retrieved from the MV rather than from a base table upon which it depends. This may improve query performance. Consider a first query that creates an MV.

```
Q1:
CREATE MATERIALIZED VIEW
v1(groupcol1, groupcol2, aggr) AS
SELECT groupcol1, groupcol2, MyAVG(aggrcol)
FROM t1
GROUP BY groupcol1, groupcol2;
```

Typically, a database would not have enough information about the user-defined aggregate function to support a query that seeks to retrieve the value of the user-defined aggregate from the MV. For example,

```
Q2:
SELECT groupcol1, MyAVG(aggrcol)
FROM t1
GROUP BY groupcol1;
``` would lead to a scan of table t1 to return the final result rather than an access to the MV. Example systems and methods provide an aggregation context (e.g., a instance of type MyAVGImpl), that is materialized as a new column (agg_ctx) in the view v1. Thus, a query can be rewritten to acquire the user-defined aggregate value from the MV rather than causing a table scan.

```
Q3:
CREATE MATERIALIZED VIEW
v1(groupcol1, groupcol2, aggr, aggr_ctx) AS
SELECT groupcol1, groupcol2,
MyAVG(aggrcol), MyAVG_ITERATE_AGGR_CTX(aggrcol)
FROM t1
GROUP BY groupcol1, groupcol2;
``` where MyAVG_ITERATE_AGGR_CTX(aggrcol) is a user-defined aggregate function that is used to compute the aggregate context for MyAVG(aggrcol) (e.g., the aggregate function calls MyAVGImpl.Iterate to update the aggregation context and return the resultant aggregation context). Thus, example systems and methods facilitate rewriting Q1 to Q4 as:

```
Q4:
SELECT groupcol1,
MyAVGImpl.
Terminate(MyAVG_MERGE_AGGR_CTX(v1.aggr_ctx))
FROM v1
GROUP BY groupcol1;
```

Note that MyAVG_MERGE_AGGR_CTX( ) is another user-defined aggregate that is used to merge the aggregate context for MyAVG( ) (e.g., the aggregate function calls MyAVGImpl.Merge to merge the existing aggregation context with another input aggregation context). Performance gains may occur since the time to scan v1 can be less than the time to scan t1. Other query rewrite options may be facilitated by using materialized aggregation contexts. For example,

```
Q5:
SELECT t1.groupcol1, t2.groupcol, MyAVG(t1.aggrcol))
FROM t1, t2
WHERE t1.groupcol2 = t2.joincol
GROUP BY t1.groupcol1, t2.groupcol;
``` can be rewritten as:

```
Q6:
SELECT v1.groupcol1, t2.groupcol,
MyAVGImpl.Terminate(MyAVGImpl.Merge(v1.aggr_ctx))
FROM v1, t2
WHERE v1.groupcol2 = t2.joincol
GROUP BY v1.groupcol1, t2.groupcol;
```

Once again, the time to scan v1 may be smaller than the time to scan t1 and thus there may be improved query performance. These examples illustrate that adding a new column "aggr_ctx", an instance of type MyAVGImpl, in the materialized view facilitates query rewrite. More generally, these examples illustrate that adding a column to support an aggregation context in a materialized view facilitates query rewrite. Adding the new column may also facilitate incremental materialized view maintenance. The following examples illustrate example processing associated with incremental MV maintenance when the MV includes a user-defined aggregate.

Consider a single insert. In this situation the exposed function Iterate( ) may be invoked on new input values from inserted rows to compute and update a materialized aggregation context (e.g., aggr_ctx,). For a batch or buffered insert, the interface function Init( ) may be invoked to create a new aggregation context for the buffered rows. Then, Iterate( ) may be invoked on new input values from inserted rows to compute and update the new aggregation context. Then, Merge( ) may be invoked to combine the aggregation context for buffered rows with the materialized aggregation context to produce the new materialized aggregation context. Finally, Terminate( ) may be invoked to compute the final user-defined aggregate.

Consider a single delete. In this situation an interface function Delete( ) may be used to delete an input value from an aggregation context. For batch or buffered delete, an interface function Split( ) may be used to split the aggregation context.

When a Delete( ) cannot incrementally regenerate an aggregation context, an error value may be returned to specify that the aggregation context and the final aggregate function value are invalid. In response to this flag, the aggregate context and/or the final aggregate function value may be recomputed from the entire data set. For example, a user-defined aggregate function MyMAX can have an aggregation context that keeps a maximum value and a second maximum value. When the maximum value is deleted, it can be replaced with the second maximum value. The second maximum value may then be set to NULL. If this new maximum value is then deleted, there is no valid second maximum to replace it. Therefore, the error value may be returned to indicate that the data set may need to be rescanned to determine the new maximum value.

FIG. 2 illustrates a system 200. System 200 includes some elements similar to those described in connection with system 100 (FIG. 1). For example, system 200 includes an interface logic 210 and an aggregate logic 220. However, system 200 may include additional elements. For example, system 200 may include a link logic 230, a detect logic 240, a provide logic 250, an initialization logic 260, an update logic 270, and a value logic 280. While eight logics are described, it is to be appreciated that the functionality provided by the eight logics may be provided by a greater and/or lesser number of logics arranged in different groupings.

In one example, the interface logic 210 includes link logic 230. Link logic 230 may logically link a base table to a materialized view. The logical connection can be made through a set of interface actions exposed by the interface logic 210. The logical connection may also involve a user-defined aggregate context stored in a materialized view. The logical connection may be made by identifying entry points or call addresses for methods associated with the interface actions and providing those locations to system 200 and/or to a database management system with which system 200 interacts.

Interface logic 210 may also include a detect logic 240 to detect a change to a base table upon which a materialized view and thus a user-defined aggregate depend. The detect logic 240 may detect the change and then determine whether the change is relevant to the materialized view. The relevance determination may be based, at least in part, on the user-defined aggregate context. For example, information about values in which the user-defined aggregate is interested may be associated with the user-defined aggregate context. If the change is relevant, then detect logic 240 may control provide logic 250 to selectively provide a data item to a materialized view. Providing the data item may include, for example, passing a value as a parameter in a method call, placing a value in a region of stored memory, storing a value in a communication register, writing a value to a known location in the user-defined aggregation context, and so on.

In system 200, aggregate logic 220 may include initialization logic 260. Initialization logic 260 may establish a location in a materialized view for a user-defined aggregate. This may involve allocating memory, manipulating a table definition, and so on. The location may be, for example, a column in the materialized view. Initialization logic 260 may also establish a location in a materialized view for the user-defined aggregate context. Once again this location may also be a column in the materialized view and may involve allocating memory, manipulating a table definition, and so on. Having established space for a user-defined aggregate and a user-defined aggregate context, initialization logic 260 may also establish a first value for a variable associated with computing the user-defined aggregate. Establishing this value may include writing a value to a memory location in the space established for the user-defined aggregate and/or user-defined aggregate context. For example, in the code provided above, a running sum and a running count were initialized. These values may be stored in memory associated with a user-defined aggregate context. For example the values may be stored in memory allocated to an instance of a data type associated with the user-defined aggregate. Initialization logic 260 may also establish a first value for the user-defined aggregate. Initialization logic 260 may detect that a materialized view having a user-defined aggregate has been created. Upon detecting the creation, initialization logic 260 may invoke initialization methods exposed by interface logic 210. Which methods are to be invoked may be controlled, at least in part, by the logical connection established by link logic 230.

Aggregate logic 220 may also include an update logic 270. Update logic 270 may selectively update a user-defined aggregate based, at least in part, on a data item received from the interface logic 210. The data item may have been identified by the detect logic 240 and provided by the provide logic 250 using a logical connection established by the link logic 230. The update performed by update logic 270 may be controlled, at least in part, by the user-defined aggregate context. For example, executable instructions for performing the update may be stored in methods associated with the user-defined aggregate context. Different data manipulation language actions may occur at a base table. Thus, the update logic 270 may perform different actions based on the data manipulation language action occurring at the base table. In different examples the update logic 270 may perform a single insertion, a single delete, a merge insertion, a split deletion, and so on.

Aggregate logic 220 may also include a value logic 280. Value logic 280 may selectively provide the value of the user-defined aggregate. The providing may be controlled, at least in part, by the user-defined aggregate context. Providing the value of the user-defined aggregate may include displaying a value to a user, passing the value to a downstream consumer, storing the value in a memory, writing the value to a computer-readable medium, and so on.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on.

It has proven convenient at times, principally for reasons of common usage, to refer to these signals as bits, values, elements, symbols, characters, terms, numbers, or so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. Flow diagrams illustrate functional information one skilled in the art could use to design/fabricate circuits, generate software, or use a combination of hardware and software to perform the illustrated processing.

Figure 3:
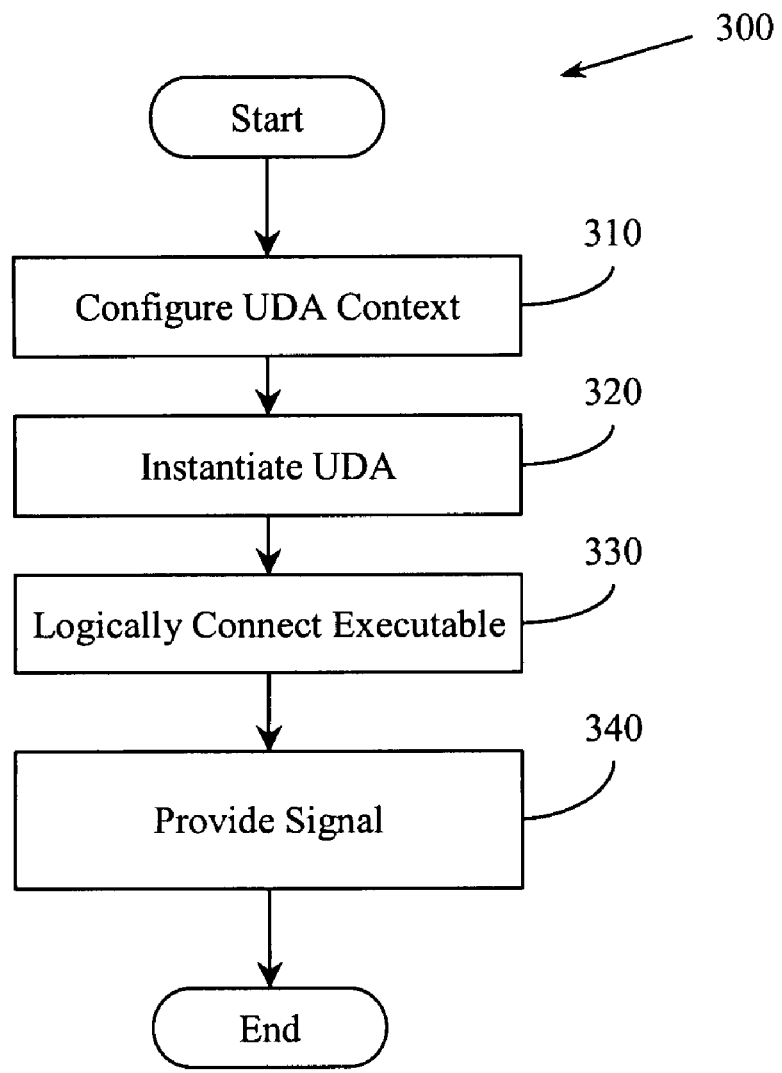
FIG. 3 illustrates an example method associated with materialized views having user-defined aggregates.

FIG. 3 illustrates a method 300 associated with materialized views having user-defined aggregates. Method 300 may include, at 310, configuring a user-defined aggregate (UDA) context to support a user-defined aggregate in a view materialized from a base table. The view may be referred to as a materialized view. The user-defined aggregation context may be an object that is an instance of a user-defined type (e.g., class). In different examples the configuring at 310 may occur when the view is scheduled for materializing, as the view is being materialized, after the view has been materialized, and so on. Configuring the user-defined aggregate context may include, for example, storing the user-defined aggregate context. In different examples the user-defined aggregate context may be stored in the materialized view and/or in an implementation type instance of the user-defined aggregate. Configuring the user-defined aggregate context may also include logically connecting the stored user-defined aggregate context to both the base table and to the instantiated user-defined aggregate. The logical connecting may include, for example, sharing address information, registering interface function addresses, passing pointers, writing entry points to memory, and so on.

Method 300 may also include, at 320, instantiating the user-defined aggregate based, at least in part, on the user-defined aggregate context. Instantiating the user-defined aggregate refers to creating an instance of a user-defined type (e.g., class). In one example, instantiating the user-defined aggregate may include instantiating an executable that will be involved in updating the user-defined aggregate. This may include, for example, allocating memory for executable instructions, writing executable instructions to memory, allocating memory for variables used by the executable, initializing values for the variables, and so on. Instantiating the user-defined aggregate may also include registering the location of executable instructions associated with different functions with a dispatch logic, an operating system, a database management system, and so on. The different functions may be involved in initializing a user-defined aggregate, updating a user-defined aggregate, providing the value of a user-defined aggregate, and so on. The registering facilitates making the executable callable by a process associated with updating the base table.

The executable may be configured to accept incremental update data associated with a change to the base table. The executable may then incrementally update the user-defined aggregate using the incremental update data. Incrementally updating the user-defined aggregate may include performing, for example, a single insert, a multiple insert, a single delete, a multiple delete, and so on. While four update functions are described, it is to be appreciated that a greater and/or lesser number of update functions may be associated with different user-defined aggregates.

Method 300 may also include, at 330, logically connecting an executable to the base table. As described above, the executable is to be associated with the user-defined aggregate and is to be accessible via the user-defined aggregate context. Being accessible may include, for example, being able to be invoked through information available in the user-defined aggregate context. As described above, the executable is to incrementally update the user-defined aggregate based, at least in part, on incremental update data received from the base table. This data may be provided when the base table experiences, for example, an insert or a delete. More generally, the data may be provided when the base table experiences an update. In one example, the update may be associated with a data manipulation language statement. Thus, a database management system may detect a data manipulation language statement to be applied against a base table from which a view has been materialized. If the materialized view includes a user-defined aggregate, then incremental update data may be provided to functions associated with the user-defined aggregate, where the providing will depend on information stored in the user-defined aggregate context.

Method 300 may also include, at 340, providing a signal. The signal may indicate, for example, that the view can be incrementally updated. This signal may be provided, for example, to a database management system. The signal may also indicate, for example, that the user-defined aggregate can be incrementally updated. Once again this signal may be provided, for example, to a database management system. The signal may also indicate that a query associated with both the base table and the user-defined aggregate can be rewritten to query the view. This signal may be provided, for example, to a query rewrite logic.

While FIG. 3 illustrates various actions occurring in serial, it is to be appreciated that various actions illustrated in FIG. 3 could occur substantially in parallel. By way of illustration, a first process could configure user-defined aggregate contexts while a second process could instantiate user-defined aggregates and a third process could logically connect executables to a base table and to user-defined aggregates. While three processes are described, it is to be appreciated that a greater and/or lesser number of processes could be employed and that lightweight processes, regular processes, threads, and other approaches could be employed.

Figure 4:
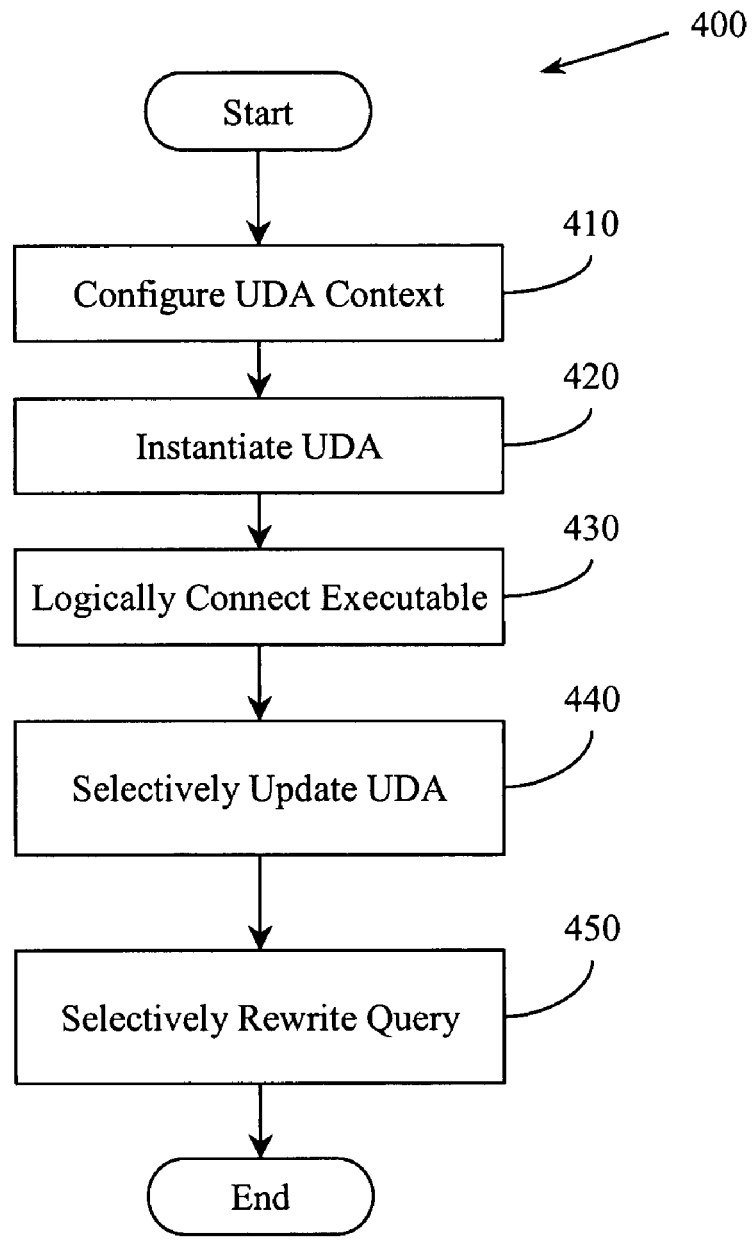
FIG. 4 illustrates another example method associated with materialized views having user-defined aggregates.

FIG. 4 illustrates a method 400 with some actions similar to those described in connection with method 300 (FIG. 3). For example, method 400 includes configuring a user-defined aggregate (UDA) context at 410, instantiating a UDA at 420, and logically connecting an executable at 430. However, method 400 may include additional actions.

For example, method 400 may include, at 440, selectively updating a user-defined aggregate based, at least in part, on incremental update data received from a process associated with updating a base table upon which a materialized view is based and with which the user-defined aggregate is associated. As described above, a database logic may detect a change to a base table upon which a view has been materialized. This materialized view may include a user-defined aggregate. A user-defined aggregate context may store information that facilitates routing data associated with the base table change to functions for incrementally updating the user-defined aggregate.

Additionally, method 400 may include, at 450, controlling a query rewrite logic to selectively rewrite a query associated with both the base table and the user-defined aggregate. The query may be rewritten to retrieve data from the materialized view and the user-defined aggregate rather than from the base table. Scan time over a materialized view may be shorter than scan time over a base table(s) from which a view was materialized, and thus the rewritten query may execute in a shorter period of time than the original query.

Figure 5:
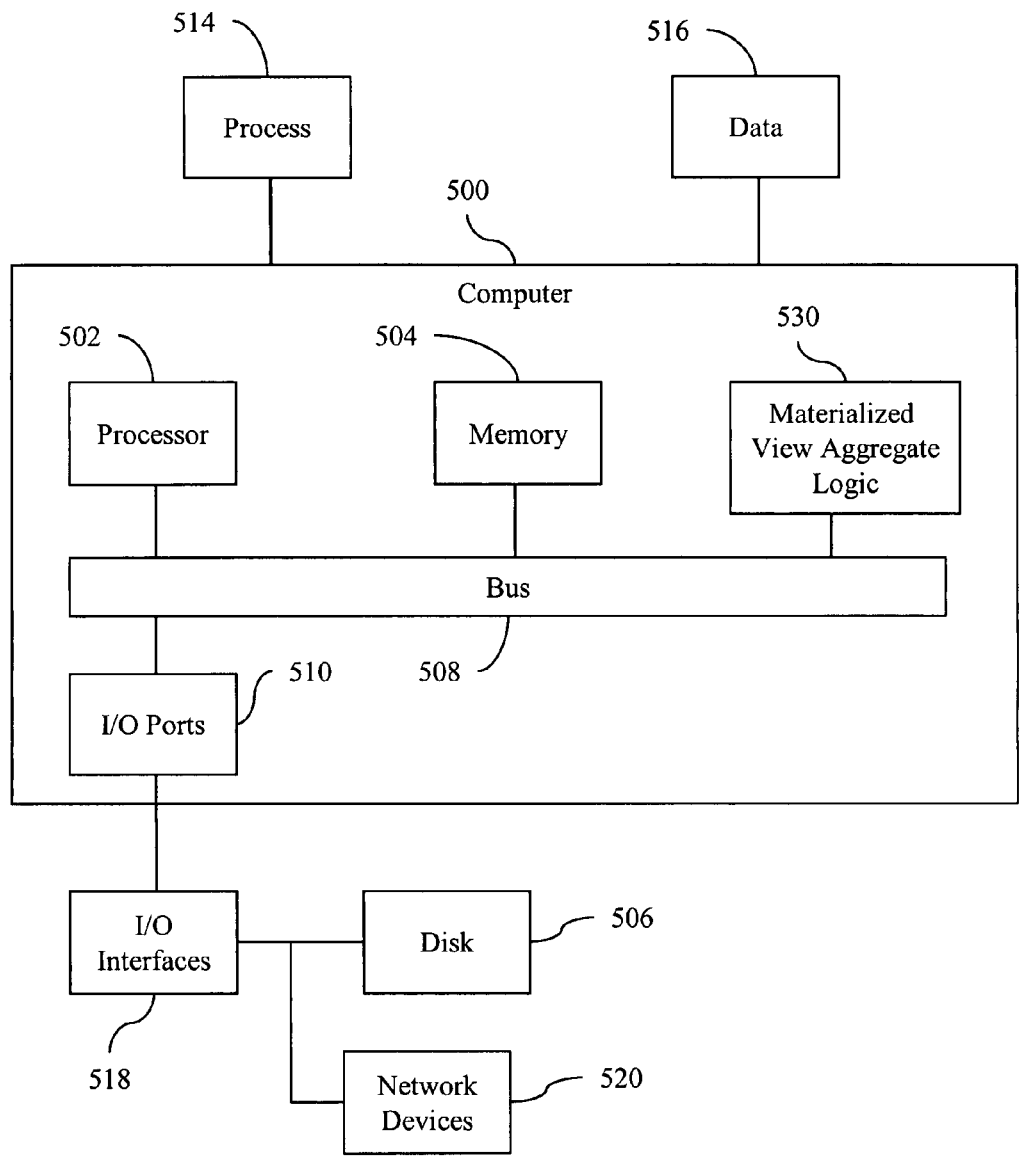
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, the computer 500 may include a materialized view aggregate logic 530. In one example, logic 530 may include means (e.g., hardware, software in execution, firmware) for associating a user-defined aggregate and a user-defined aggregate context with a view materialized from a database table. The association may include storing a user-defined aggregate in a materialized view and populating entry points associated with an exposed interface associated with the user-defined aggregate context. Logic 530 may also include means (e.g., hardware, software in execution, firmware) for incrementally updating the user-defined aggregate using delta data from the database table. The delta data may describe, for example, insertions, deletions, changes, and so on of data in the base table. The updating may be performed by logic associated with the user-defined aggregate, where the logic is made accessible to the database table through the user-defined aggregate context. Logic 530 may also include means (e.g., hardware, software in execution, firmware) for rewriting a query associated with both the base table and the user-defined aggregate.

Generally describing an example configuration of the computer 500, the processor 502 can be a variety of various processors including dual microprocessor and other multi-processor architectures. The memory 504 can include volatile memory and/or non-volatile memory. The non-volatile memory can include, but is not limited to, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an input/output interface (e.g., card, device) 518 and an input/output port 510. The disk 506 may be, for example a magnetic disk drive, a solid state disk drive, a floppy disk drive, a tape drive, a Zip drive, a flash memory card, a memory stick, and so on. The disk 506 may be an optical drive (e.g., CD-ROM, CD recordable drive (CD-R drive), CD rewriteable drive (CD-RW drive), digital video ROM drive (DVD ROM)). The memory 504 can store processes 514 and/or data 516, for example. The disk 506 and/or memory 504 can store an operating system that controls and allocates resources of the computer 500. Disk 506 and/or memory 504 may also store data 516.

The bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and so on. The input/output ports 510 can include but are not limited to, serial ports, parallel ports, and USB ports.

The computer 500 can operate in a network environment and thus may be connected to network devices 520 via the i/o devices 518, and/or the i/o ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 520 can connect to WAN technologies including, but not limited to, point to point links, circuit switching networks (e.g., integrated services digital networks (ISDN), packet switching networks, digital subscriber lines (DSL)).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
    an interface logic, embodied on a computer-readable storage medium, to expose a set of interface actions to support a user-defined aggregate in a materialized view associated with a base table, the materialized view and the user-defined aggregate being associated with a user-defined aggregate context;
    an aggregate logic, embodied on a computer-readable storage medium, to support the user-defined aggregate through the user-defined aggregate context, where the user-defined aggregate context is configured to be invoked by at least one interface action from the set of interface actions based, at least in part, on data in the materialized view to facilitate incremental updating of the materialized view;
    where the aggregate logic includes an initialization logic to establish a location in the materialized view for the user-defined aggregate, to establish a location in the materialized view for the user-defined aggregate context, to establish a first value for one or more values associated with computing the user-defined aggregate, and to establish a first value for the user-defined aggregate;
    where the aggregate logic includes an update logic to selectively update the user-defined aggregate based, at least in part, on a data item received from the interface logic, the update being controlled, at least in part, by the user-defined aggregate context;
    where the user-defined aggregate context is one of, an instance of a user-defined data type that stores information to maintain the user-defined aggregate, an instance of a user-defined data type that stores executable instructions to maintain the user-defined aggregate, and an object that is an instance of a user-defined type; and
    where the system is to control a query rewrite logic associated with a database in which the base table resides to selectively rewrite a query to access the base table into a query to access the materialized view.

2. The system of claim 1, where the interface logic includes a link logic to logically link the base table to the materialized view through the set of interface actions and the user-defined aggregate context, the set of interface actions to include an initialization action, an update action, and a value reporting action.

3. The system of claim 2, where the interface logic includes a detect logic to detect a change to the base table and to determine that the change is relevant to the materialized view based, at least in part, on the user-defined aggregate context.

4. The system of claim 3, where the interface logic includes a provide logic to selectively provide a data item to the materialized view in response to the detect logic determining that the item is relevant to the materialized view.

5. The system of claim 1, where the user-defined aggregate context is configured to generate additional data in a column of the materialized view in response to the at least one action from the set of interface actions.

6. The system of claim 1, where the aggregate logic includes a value logic to selectively provide the value of the user-defined aggregate, the providing being controlled, at least in part, by the user-defined aggregate context.

7. The system of claim 1, where the system is to control an incremental update logic associated with a database in which the base table resides to selectively incrementally update the materialized view.

8. A system, embodied on a non-transitory computer-readable storage medium, comprising:
    interface logic to expose a set of interface actions to support a user-defined aggregate in a materialized view associated with a base table, the materialized view and the user-defined aggregate being associated with a user-defined aggregate context;
        wherein the interface logic includes a link logic, a detect logic, and a provide logic, the link logic to logically link the base table to the materialized view through the set of interface actions and the user-defined aggregate context, the set of interface actions to include an initialization action, an update action, and a value reporting action, the detect logic to detect a change to the base table and to determine that the change is relevant to the materialized view based, at least in part, on the user-defined aggregate context, the provide logic to selectively provide a data item to the materialized view in response to the detect logic determining that the item is relevant to the materialized view,
    aggregate logic to support the user-defined aggregate through the user-defined aggregate context based, at least in part, on the set of interface actions, where the user-defined aggregate facilitates incremental updating of the materialized view;
        wherein the aggregate logic includes an initialization logic, an update logic, and a value logic, the initialization logic to establish a location in the materialized view for the user-defined aggregate, to establish a location in the materialized view for the user-defined aggregate context, to establish a first value for one or more values associated with computing the user-defined aggregate, and to establish a first value for the user-defined aggregate, the update logic to selectively update the user-defined aggregate based, at least in part, on a data item received from the interface logic, the update being controlled, at least in part, by the user-defined aggregate context, the value logic to selectively provide the value of the user-defined aggregate, the providing being controlled, at least in part, by the user-defined aggregate context, wherein the system is to control an incremental update logic associated with a database in which the base table resides to selectively incrementally update the materialized view, and wherein the system is to control a query rewrite logic associated with a database in which the base table resides to selectively rewrite a query to access the base table into a query to access the materialized view.

* * * * *